United States Patent
Inukai et al.

(10) Patent No.: US 9,257,094 B2
(45) Date of Patent: Feb. 9, 2016

(54) PROJECTION DISPLAY DEVICE, PROJECTION DISPLAY METHOD, AND COMPUTER PROGRAM

(71) Applicants: Yoshihiro Inukai, Kanagawa (JP); Shinichi Wakahara, Kanagawa (JP); Naofumi Yoshimizu, Saitama (JP); Akira Murakata, Tokyo (JP); Taira Matsuoka, Kanagawa (JP); Taro Kikuchi, Tokyo (JP)

(72) Inventors: Yoshihiro Inukai, Kanagawa (JP); Shinichi Wakahara, Kanagawa (JP); Naofumi Yoshimizu, Saitama (JP); Akira Murakata, Tokyo (JP); Taira Matsuoka, Kanagawa (JP); Taro Kikuchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 413 days.

(21) Appl. No.: 13/724,858

(22) Filed: Dec. 21, 2012

(65) Prior Publication Data
US 2013/0169607 A1    Jul. 4, 2013

(30) Foreign Application Priority Data

Jan. 4, 2012  (JP) ................................ 2012-000127

(51) Int. Cl.
| | |
|---|---|
| G09G 5/37 | (2006.01) |
| G09G 5/10 | (2006.01) |
| G09G 5/14 | (2006.01) |
| H04N 1/405 | (2006.01) |
| H04N 1/40 | (2006.01) |
| H04N 9/31 | (2006.01) |
| G06F 3/12 | (2006.01) |

(52) U.S. Cl.
CPC .. *G09G 5/10* (2013.01); *G09G 5/14* (2013.01); *H04N 1/40018* (2013.01); *H04N 1/40062* (2013.01); *H04N 9/3179* (2013.01); *H04N 9/3194* (2013.01); *G06F 3/1208* (2013.01); *G06F 3/1256* (2013.01); *G09G 2320/0686* (2013.01); *G09G 2360/16* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,924,301 | A  * | 5/1990 | Surbrook | 358/534 |
| 6,236,474 | B1 * | 5/2001 | Mestha et al. | 358/520 |
| 6,404,917 | B1 * | 6/2002 | Kondo et al. | 382/166 |
| 6,898,329 | B1 * | 5/2005 | Takahashi | 382/272 |
| 8,717,648 | B2 * | 5/2014 | Togami | 358/518 |
| 2002/0015043 | A1 | 2/2002 | Matsuda | |
| 2003/0020725 | A1 | 1/2003 | Matsuda | |
| 2003/0090742 | A1 * | 5/2003 | Fukuda et al. | 358/448 |
| 2005/0225565 | A1 * | 10/2005 | Seong et al. | 345/611 |
| 2006/0008147 | A1 * | 1/2006 | Jung et al. | 382/176 |
| 2007/0058224 | A1 * | 3/2007 | Kawamoto et al. | 358/518 |
| 2008/0037036 | A1 * | 2/2008 | Togami et al. | 358/1.1 |
| 2009/0289951 | A1 * | 11/2009 | Matsuda | 345/589 |

FOREIGN PATENT DOCUMENTS

| | | |
|---|---|---|
| JP | 2005-165107 | 6/2005 |
| JP | 2006-304316 | 11/2006 |
| JP | 2009-034829 | 2/2009 |

* cited by examiner

*Primary Examiner* — Stephen R Koziol
*Assistant Examiner* — Robert Craddock
(74) *Attorney, Agent, or Firm* — Harness, Dickey & Pierce P.L.C.

(57) ABSTRACT

A projection display device according to the invention includes a separating unit that assigns X separation information for identifying a type of an image to each pixel by using a characteristic amount of the input image, a luminance detecting unit that detects a luminance of a screen, a first determining unit that determines a first target region indicating a region on which halftone processing of converting the number of gradations is performed on the input image by using the X separation information, and a halftone processing unit that executes the halftone processing that varies depending on the luminance on the first target region.

10 Claims, 8 Drawing Sheets

| SEPARATION ELEMENT | WHITE BACKGROUND (1)/ NON-WHITE BACKGROUND (0) | x | x | x | 1 | 0 |
|---|---|---|---|---|---|---|
| | CHARACTER (1)/ NON-CHARACTER (0) | 1 | 1 | 0 | 0 | 0 |
| | HALFTONE (1)/ NON-HALFTONE (0) | x | x | 1 | 0 | 0 |
| | BRIGHT PORTION (1)/ NON-BRIGHT PORTION (0) | 1 | 0 | x | x | x |
| | X SEPARATION INFORMATION | LOW-CONTRAST CHARACTER | CHARACTER | HALFTONE | HIGHLIGHT | SOLID |

| X SEPARATION INFORMATION | LOW-CONTRAST CHARACTER | CHARACTER | HALFTONE | HIGHLIGHT | SOLID |
|---|---|---|---|---|---|
| γ CORRECTION | γ-CORRECT | SKIP | SKIP | SKIP | SKIP |

|  |  | X SEPARATION INFORMATION | | | | |
|---|---|---|---|---|---|---|
|  |  | LOW-CONTRAST CHARACTER | CHARACTER | HALFTONE | HIGHLIGHT | SOLID |
| S LUMINANCE INFORMATION | BRIGHT | SIMPLE FOUR VALUE | SKIP | SKIP | HIGH SCREEN RULING BINARY DITHER | SKIP |
|  | DARK | SIMPLE NINE VALUE | SKIP | SKIP | HIGH SCREEN RULING BINARY DITHER | SKIP |

|  |  | X SEPARATION INFORMATION | | | | |
|---|---|---|---|---|---|---|
|  |  | LOW-CONTRAST CHARACTER | CHARACTER | HALFTONE | HIGHLIGHT | SOLID |
| S LUMINANCE INFORMATION | BRIGHT | γ CORRECTION 1 | SKIP | SKIP | SKIP | SKIP |
|  | DARK | γ CORRECTION 2 | SKIP | SKIP | SKIP | SKIP |

FIG.13

PROJECTION DISPLAY DEVICE, PROJECTION DISPLAY METHOD, AND COMPUTER PROGRAM

CROSS-REFERENCE TO RELATED APPLICATIONS

The present application claims priority to and incorporates by reference the entire contents of Japanese Patent Application No. 2012-000127 filed in Japan on Jan. 4, 2012.

BACKGROUND OF THE INVENTION

1. Field of the Invention

The present invention relates to a projection display device, a projection display method, and a computer program.

2. Description of the Related Art

Conventionally, known is a technique of performing preview display of an image to be printed by a printing device by a projection display device such as a projector. Japanese Patent Application Laid-open No. 2006-304316 discloses a technique of correcting image data for increasing output on low-gradation portions (shadow portions) based on color information and brightness information of a projection screen of the projector in order to enhance the reproducibility of colors.

The technique disclosed in Japanese Patent Application Laid-open No. 2006-304316, however, fails to sufficiently enhance the reproducibility of colors. For example, the technique disclosed in Japanese Patent Application Laid-open No. 2006-304316 fails to enhance the reproducibility on high-gradation portions (highlight portions).

SUMMARY OF THE INVENTION

It is an object of the present invention to at least partially solve the problems in the conventional technology.

There is needed to provide a projection display device, a projection display method, and a computer program that can sufficiently enhance the reproducibility of colors.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, embodiments of a projection display device, a projection display method, and a computer program according to the present invention are described in detail with reference to the accompanying drawings. A projector is described as an example of the projection display device in the following but the projection display device is not limited thereto.

A: First Embodiment

Figure 1:
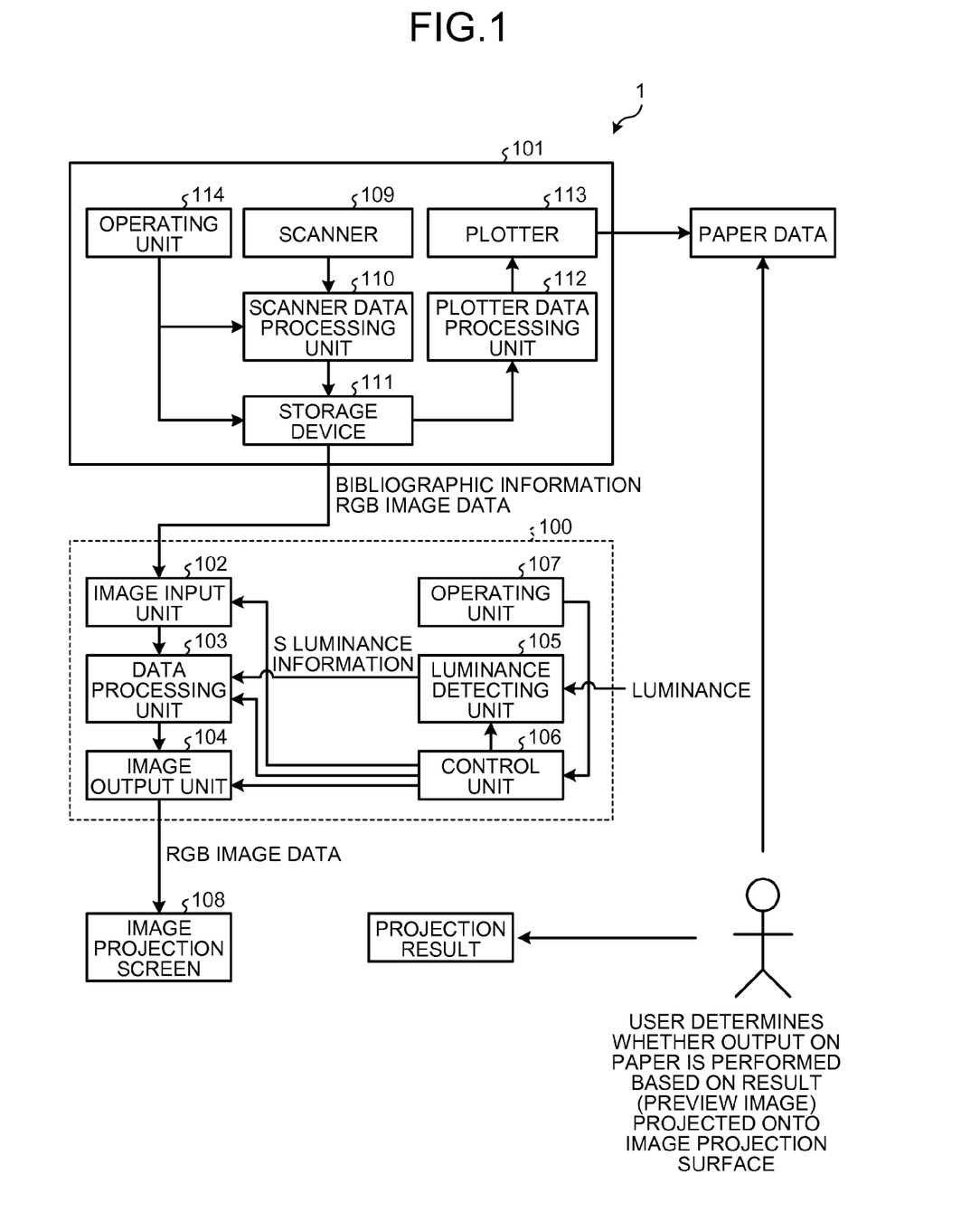
FIG. 1 is a block diagram illustrating a configuration example of an information projection system.

FIG. 1 is a diagram illustrating a schematic configuration example of an information projection system 1 according to the embodiment. As illustrated in FIG. 1, the information projection system 1 includes a projector 100 and a multifunction peripheral (MFP) 101 that is an external device. The MFP 101 outputs image data of a scanned document to the projector 100 as an input image. The MFP 101 includes a scanner 109, a scanner data processing unit 110, a storage device 111, a plotter data processing unit 112, a plotter 113, and an operating unit 114.

The scanner 109 scans image data on a document. The scanner data processing unit 110 performs scanner-correction-type image processing, such as black correction and shading correction, on the image data scanned by the scanner 109. The operating unit 114 is an external I/F that receives input of specification of bibliographic information indicating operation conditions of the MFP 101. Examples of the bibliographic information include information specifying a document mode, the resolution of an image, and the density of an image.

The scanner data processing unit 110 performs image processing in accordance with the bibliographic information received by the operating unit 114 on image data scanned by the scanner 109. The storage device 111 stores image data (image data in an RGB format in this example) after having been subjected to the image processing by the scanner data processing unit 110 and the bibliographic information received by the operating unit 114. The plotter data processing unit 112 performs plotter-correction-type image processing on the image data stored in the storage device 111. When the plotter 113 receives the image data on which the image processing has been performed by the plotter data processing unit 112, the plotter 113 outputs (outputs on paper) the received image data onto transfer paper by using an electrophotography process by using laser beam.

The projector 100 includes an image input unit 102, a data processing unit 103, an image output unit 104, a luminance detecting unit 105, a control unit 106, and an operating unit 107. The projector 100 and the MFP 101, which is an external device, are connected to each other through network such as a LAN or a USB.

The image input unit 102 loads the image data (image data in the RGB format) and the bibliographic information stored in the storage device 111 of the MFP 101. In the embodiment, as an example, a gradation of one pixel on each image data in the RGB format that has been loaded by the image input unit 102 is expressed by 8 bits. That is to say, each image data in the RGB format that has been loaded by the image input unit 102 is image data of 8 bits. In the following description, the image data of RGB each having 8 bits that has been loaded by the image input unit 102 is referred to as an "input image".

The data processing unit 103 performs image processing for correcting the input image loaded by the image input unit 102 to image data to be projected onto an image projection screen 108. Detailed contents of the image processing are described in detail later.

The image output unit 104 projects (outputs) the image data on which the image processing by the data processing unit 103 has been performed onto the image projection screen 108. The image output unit 104 is constituted by including a light source formed by a fixed-type light source such as a mercury lamp and an LED, a transmission-type liquid crystal panel, and a projection lens. Light from the light source is divided into three primary colors (red, blue, green) on the transmission-type liquid crystal panel and the divided light components are enlarged by the projection lens so as to be projected onto the image projection screen 108.

The luminance detecting unit 105 takes a luminance that is brightness of reflected light from the image projection screen 108 as input and converts it to S luminance information. To be more specific, the luminance detecting unit 105 loads the reflected light from the image projection screen 108 as the luminance and converts the luminance to a voltage by a photodiode, for example. Then, the converted voltage is converted to a digital value (for example, 8 bits) by an A/D converter so as to obtain the S luminance information.

The operating unit 107 is a user interface that receives various types of operation inputs. The control unit 106 controls the projector 100 overall. The control unit 106 is constituted by including a CPU, a volatile memory such as a RAM to be used for storing data temporarily and a non-volatile memory such as a ROM and an NVRAM in which programs and image processing parameters are stored. The CPU of the control unit 106 loads the programs stored in the non-volatile memory and the like and develops and executes the loaded programs on the volatile memory so as to control each part of the projector 100. The control unit 106 controls each part (the image input unit 102, the data processing unit 103, the image output unit 104, the luminance detecting unit 105, and the like) of the projector 100 in accordance with contents (bibliographic information) specified by a user.

In the information projection system 1 according to the embodiment, a user can check image data projected onto the image projection screen 108 as a preview image of a print image of the MFP 101 and determine whether printing by the MFP 101 is executed.

Figure 2:
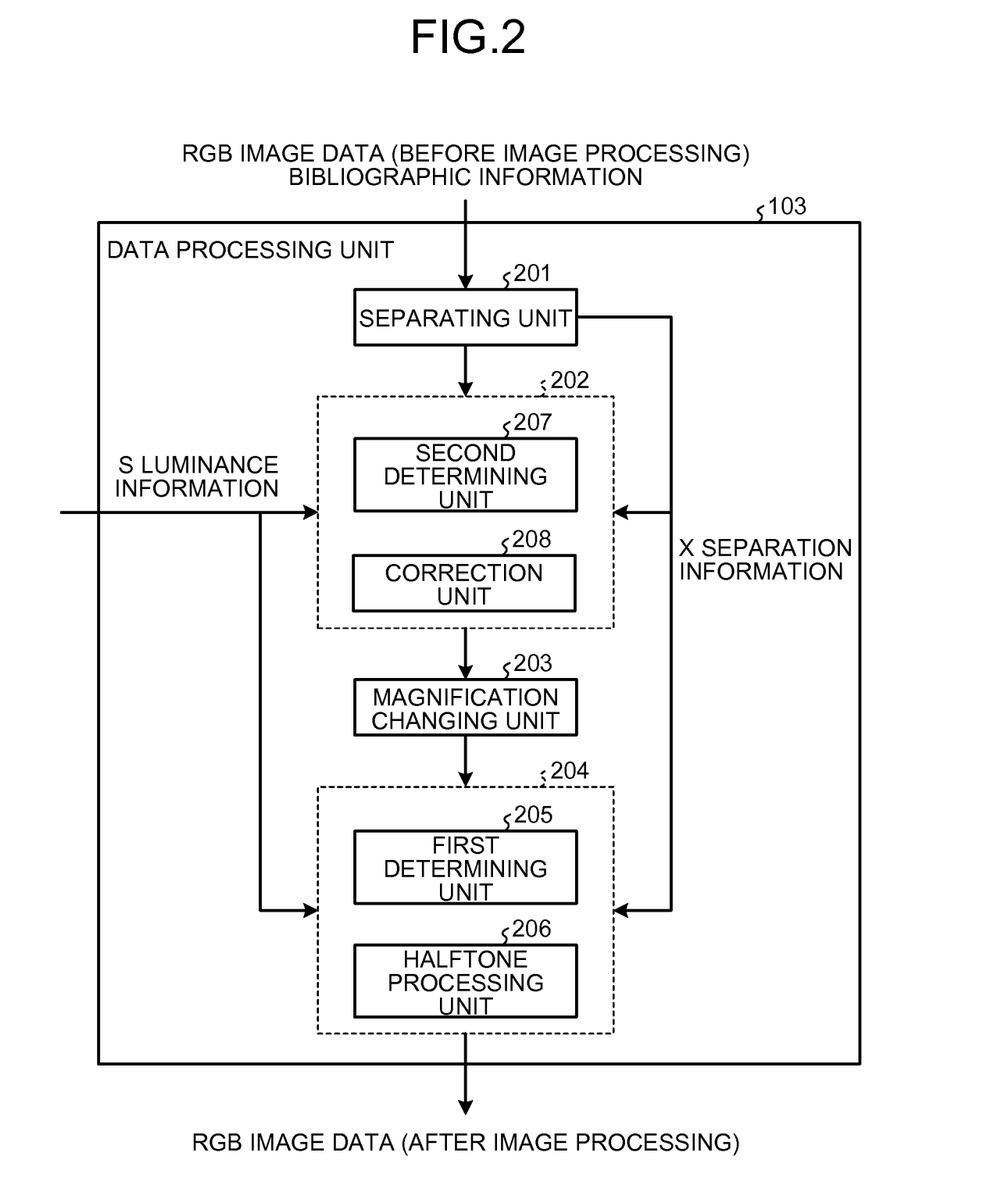
FIG. 2 is a diagram illustrating detailed contents of a data processing unit.

Next, detailed contents of the data processing unit 103 of the projector 100 are described with reference to FIG. 2. As illustrated in FIG. 2, the data processing unit 103 includes a separating unit 201, a gradation correction unit 202, a magnification changing unit 203, and a gradation processing unit 204.

Figure 3:
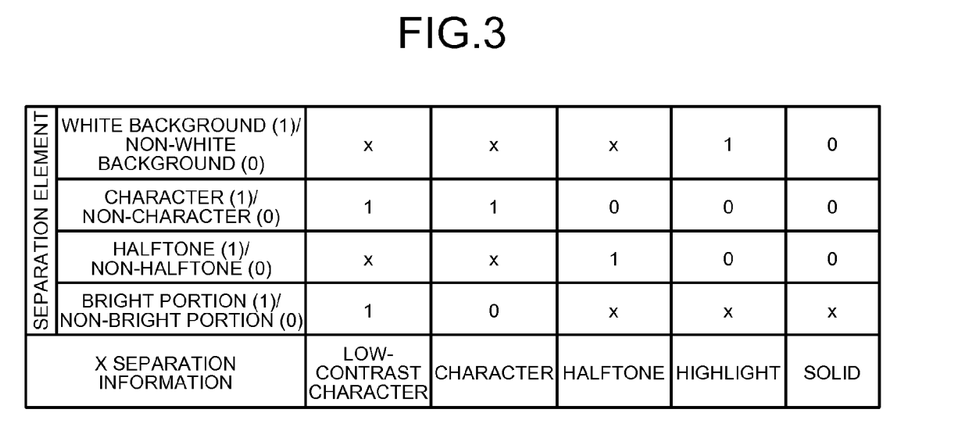
FIG. 3 is a table for explaining a method of assigning X separation information.

The separating unit 201 calculates characteristic amounts such as a density value and an edge amount of the input image loaded by the image input unit 102. Then, the separating unit 201 assigns X separation information to be used for subsequent image processing to each pixel by using the calculated characteristic amounts. The X separation information is identification information for identifying a type of the image. The separating unit 201 corresponds to an "assigning unit" in the scope of the present invention. In the embodiment, as illustrated in FIG. 3, the following five types are prepared as the "X separation information" and each of them is expressed by data of 4 bits. The five types include a "low-contrast character" indicating a character image of which gradation value is equal to or higher than a threshold, a "character" indicating a character image of which gradation value is lower than the threshold, "halftone", "highlight" indicating an image of which gradation value is equal to or higher than the threshold, and "solid" indicating a filled image.

The separating unit 201 determines whether a pixel corresponds to either of white background or non-white background, either of a character or a non-character, either of halftone or non-halftone, and either of a bright portion or a non-bright portion for each pixel of the input image. Note that when the pixel corresponds to the white background, the most significant bit in the data of 4 bits indicating the X separation information corresponds to "1", and when the pixel corresponds to the non-white background, the most significant bit is "0". When the pixel corresponds to the character, the second significant bit is "1", and when the pixel corresponds to the non-character, the second significant bit is "0". When the pixel corresponds to the halftone, the third significant bit is "1", and when the pixel corresponds to the non-halftone, the third significant bit is "0". When the pixel corresponds to the bright portion, the least significant bit is "1", and when the pixel corresponds to the non-bright portion, the least significant bit is "0". Then, the separating unit 201 determines whether the pixel corresponds to any of the "low-contrast character", the "character", the "halftone", the "highlight", and the "solid" based on the determination result, and assigns data of 4 bits indicating the corresponding X separation information to the pixel.

In the example as illustrated in FIG. 3, for each pixel of the input image, when the pixel is the character and the bright portion, the separating unit 201 determines that the pixel corresponds to the "low-contrast character" and assigns data ("x1x1", note that x may be any of "0" and "1") of 4 bits indicating the "low-contrast character" to the pixel. Alternatively, when the pixel is the character and the non-bright portion, the separating unit 201 determines that the pixel corresponds to the "character" and assigns data ("x1x0") of 4 bits indicating the "character" to the pixel. Furthermore, when the pixel is the non-character and the halftone, the separating unit 201 determines that the pixel corresponds to the "halftone" and assigns data ("x01x") of 4 bits indicating the "halftone" to the pixel. In addition, when the pixel is the white background, the non-character, and the non-halftone, the separating unit 201 determines that the pixel corresponds to the "highlight" and assigns data ("100x") of 4 bits indicating the "highlight" to the pixel. Furthermore, when the pixel is the non-white background, the non-character, and the non-halftone, the separating unit 201 determines that the pixel corresponds to the "solid" and assigns data ("000x") of 4 bits indicating the "solid" to the pixel.

Figure 4:
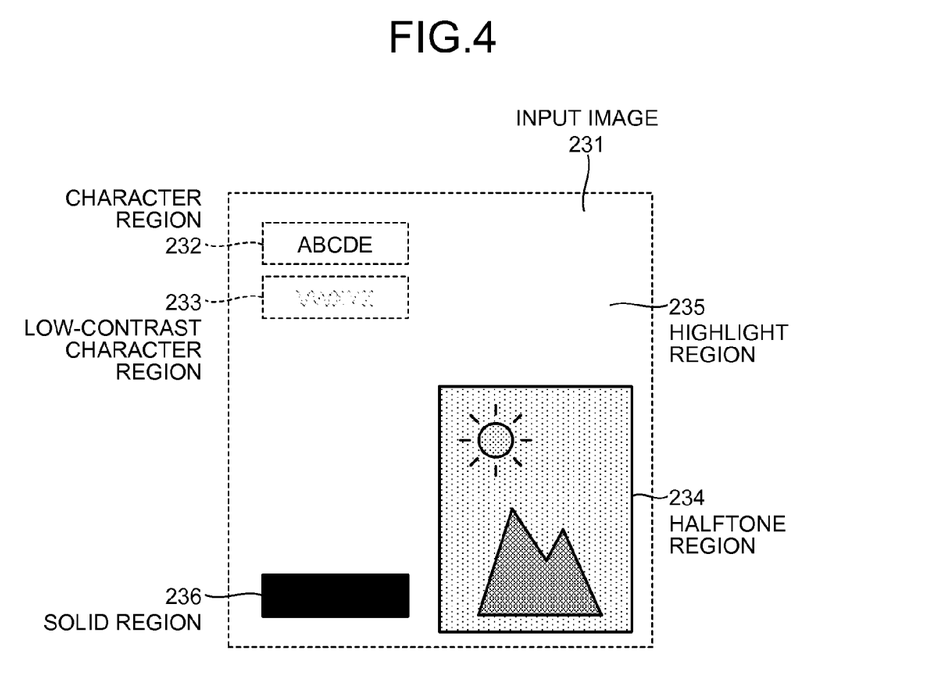
FIG. 4 is a view for explaining an example of extraction of a region corresponding to each piece of X separation information from an input image.

As described above, the separating unit 201 assigns the X separation information to each pixel of the input image. With this, as illustrated in FIG. 4, the separating unit 201 can extract a region formed by pixels to which the X separation information indicating the "low-contrast character" has been assigned on an input image 231 as a "low-contrast character region 233". In the same manner, the separating unit 201 can extract a region formed by pixels to which the X separation information indicating the "character" has been assigned on the input image 231 as a "character region 232". The separating unit 201 can extract a region formed by pixels to which the X separation information indicating the "halftone" has been assigned on the input image 231 as a "halftone region 234". The separating unit 201 can extract a region formed by pixels to which the X separation information indicating the "highlight" has been assigned on the input image 231 as a "highlight region 235". Moreover, the separating unit 201 can extract a region formed by pixels to which the X separation information indicating the "solid" has been assigned on the input image 231 as a "solid region 236".

Then, the separating unit 201 transmits the X separation information of each pixel on the input image to each of the gradation correction unit 202 and the gradation processing unit 204.

Figure 5:
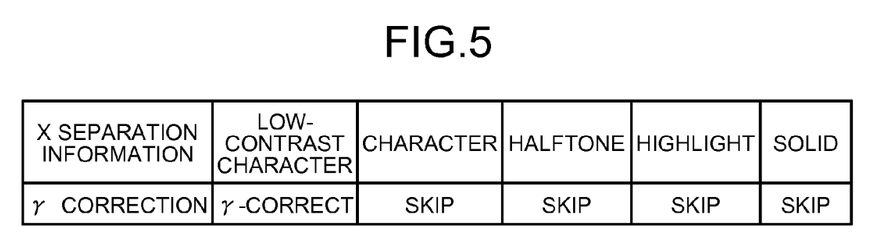
FIG. 5 is a table for explaining a method of switching γ correction in accordance with the X separation information.

Description is continued with reference to FIG. 2, again. The gradation correction unit 202 includes a second determining unit 207 and a correction unit 208. The second determining unit 207 determines a region (referred to as "second target region") on which gradation correction (in this example, γ correction) for correcting input/output characteristics of an image is performed on the input image by using the input image, the bibliographic information, S luminance information from the luminance detecting unit 105, and the X separation information from the separating unit 201 as inputs. As illustrated in FIG. 5, in the embodiment, the second determining unit 207 determines the region (low-contrast character region 233) formed by the pixels to which the X separation information indicating the "low-contrast character" has been assigned on the input image as the second target region.

Figure 6:
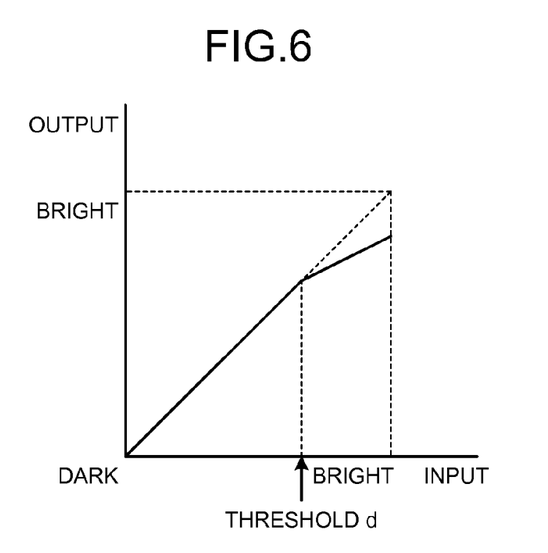
FIG. 6 is a graph illustrating an example of a γ correction curve to be used for the γ correction.

The correction unit 208 performs the γ correction on the second target region determined by the second determining unit 207. It is to be noted that the correction unit 208 does not perform the γ correction on regions other than the low-contrast character region 233 on the input image to skip them. FIG. 6 is a graph illustrating an example of a γ correction curve to be used for the γ correction by the correction unit 208. The projector 100 has a characteristic that a bright portion of the image is difficult to be reproduced. Therefore, γ correction for making the bright portion on the input image data be slightly darker is applied to the low-contrast character region 233. To be more specific, as illustrated in FIG. 6, the γ correction curve is set such that a change ratio of a gradation value of output when a gradation value of input is equal to or higher than a threshold d is lower than a change ratio of a gradation value of output when the gradation value of input is lower than the threshold d.

Description is continued with reference to FIG. 2, again. The magnification changing unit 203 performs magnification change of a resolution of the input image to a resolution received on the operating unit 107 of the projector 100 (resolution specified by a user). The magnification changing unit 203 performs a convolution operation or the like in the main scanning direction and the sub scanning direction on a resolution of the image scanned by the MFP 101 so as to execute magnification changing processing of contraction or enlargement in order to make the resolution match with a resolution of the projector 100 with reference to the bibliographic information.

Figure 7:
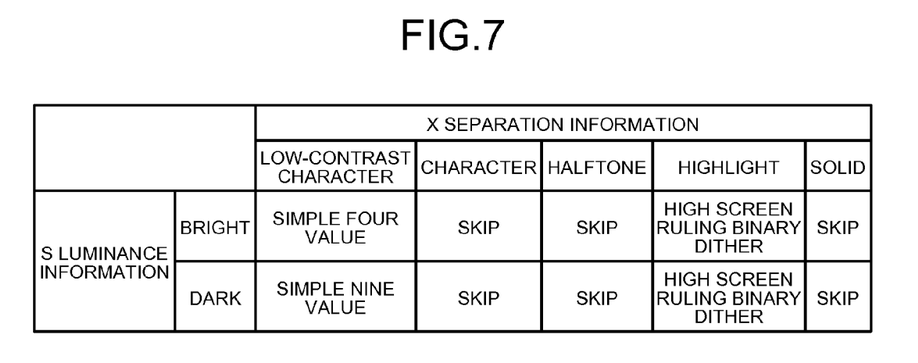
FIG. 7 is a table for explaining a method of switching halftone processing in accordance with the X separation information and S luminance information.

The gradation processing unit 204 includes a first determining unit 205 and a halftone processing unit 206. The first determining unit 205 determines a region (referred to as "first target region") on which halftone processing of converting the number of gradations is performed on the input image by using the input image, the S luminance information from the luminance detecting unit 105, and the X separation information from the separating unit 201 as inputs. As illustrated in FIG. 7, in the embodiment, the first determining unit 205 determines a region (low-contrast character region 233) formed by the pixels to which the X separation information indicating the "low-contrast character" has been assigned and the region (highlight region 235) formed by the pixels to which the X separation information indicating the "highlight" has been assigned on the input image as the first target regions.

Figure 8:
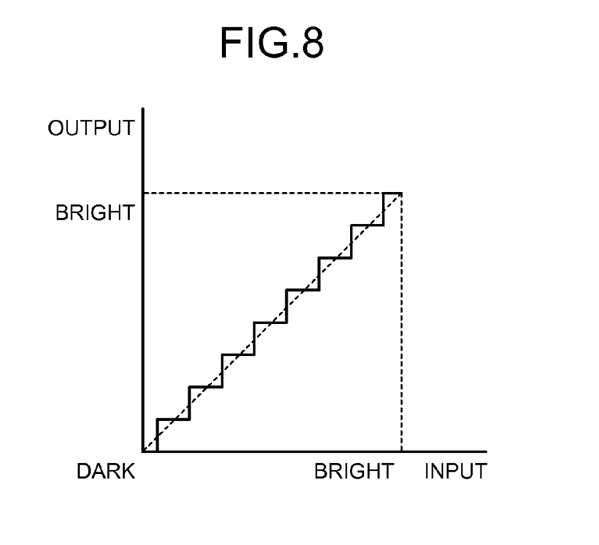
FIG. 8 is a graph illustrating an example of a correspondence relationship between an input gradation and an output gradation when simple nine-value processing is applied.

The halftone processing unit 206 executes the halftone processing that varies depending on the S luminance information on the first target regions. Description thereof is made more in detail below. At first, contents of the halftone processing to be executed on the low-contrast character region 233 are described. The halftone processing unit 206 applies simple nine-value processing as illustrated in FIG. 8 to the low-contrast character region 233 when the luminance indicated by the S luminance information is lower than a reference value (in the case of being "dark").

Figure 9:
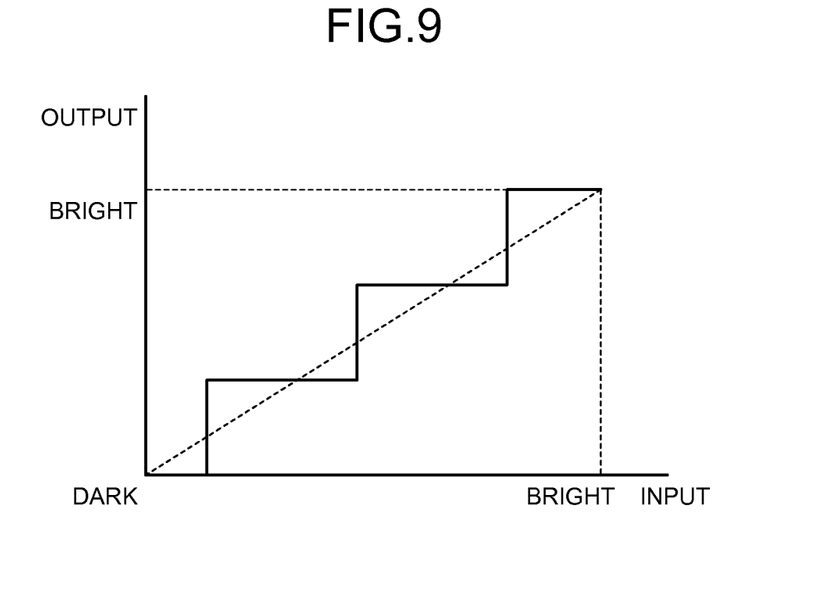
FIG. 9 is a graph illustrating an example of a correspondence relationship between an input gradation and an output gradation when simple four-value processing is applied.

On the other hand, the halftone processing unit 206 applies simple four-value processing as illustrated in FIG. 9 to the low-contrast character region 233 when the luminance indicated by the S luminance information is equal to or higher than the reference value (in the case of being "bright"). When the luminance indicated by the S luminance information is equal to or higher than the reference value (in the case of being "bright"), image visibility of the image is bad even when the simple nine-value processing is executed. Therefore, in this case, the processing is switched to the simple four-value processing so as not to use the bright portion to the extent possible. With this, the low-contrast character at the bright side is not lacked and the density becomes even, so that visibility when the image is displayed on the projector 100 is improved.

In the embodiment, the halftone processing unit 206 applies the simple four-value processing to the low-contrast character region 233 when the luminance indicated by the S luminance information is equal to or higher than the reference value. On the other hand, the halftone processing unit 206 applies the simple nine-value processing to the low-contrast character region 233 when the luminance indicated by the S luminance information is lower than the reference value. However, the processing is not limited thereto. In summary, it is sufficient that the halftone processing unit 206 executes first halftone processing on the low-contrast character region 233 when the luminance is equal to or higher than the reference value while the halftone processing unit 206 executes second halftone processing on the low-contrast character region 233 when the luminance is lower than the reference value. In this case, the number of gradations (in the embodiment, "4") after being converted through the first halftone processing is smaller than the number of gradations (in the embodiment, "9") after being converted through the second halftone processing.

Figure 10:
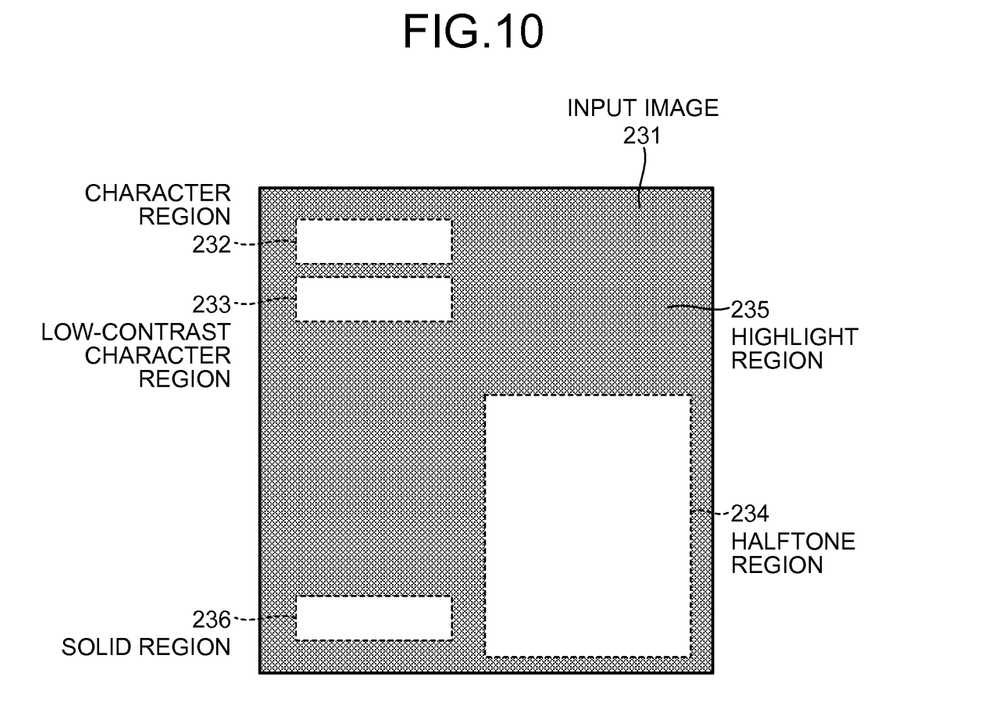
FIG. 10 is a schematic view illustrating a case when high screen ruling binary dither processing is applied to a highlight region.

Next, contents of the halftone processing to be executed on the highlight region 235 are described. Note that the projector 100 has the characteristic that a bright portion of an image is difficult to be reproduced. There arises a risk that white spots are generated when a gradation value of each pixel included in the highlight region 235 is output as it is. In order to avoid the risk, in the embodiment, dither processing with which multiple-valued image data is binarized is applied to the highlight region 235. With this, the density is expressed by an area of all black portions (a gradation is expressed by crude density of dots of "black"). Therefore, the reproducibility of highlight is improved. It is to be noted that when the luminance of the image projection screen 108 is equal to or higher than the reference value (in the case of being "bright"), the image is not influenced by environmental light therearound easily. Therefore, even when the dots of the dither processing are small, the visibility of the dots does not become bad. Therefore, the halftone processing unit 206 in the embodiment applies dither processing (high screen ruling binary dither processing) with which the high screen ruling is set is applied to the highlight region 235 when the luminance indicated by the S luminance information is equal to or higher than the reference value while taking the resolution and the like of the image into consideration. FIG. 10 is a schematic view illustrating a case when the high screen ruling binary dither processing is applied to the highlight region 235.

Figure 11:
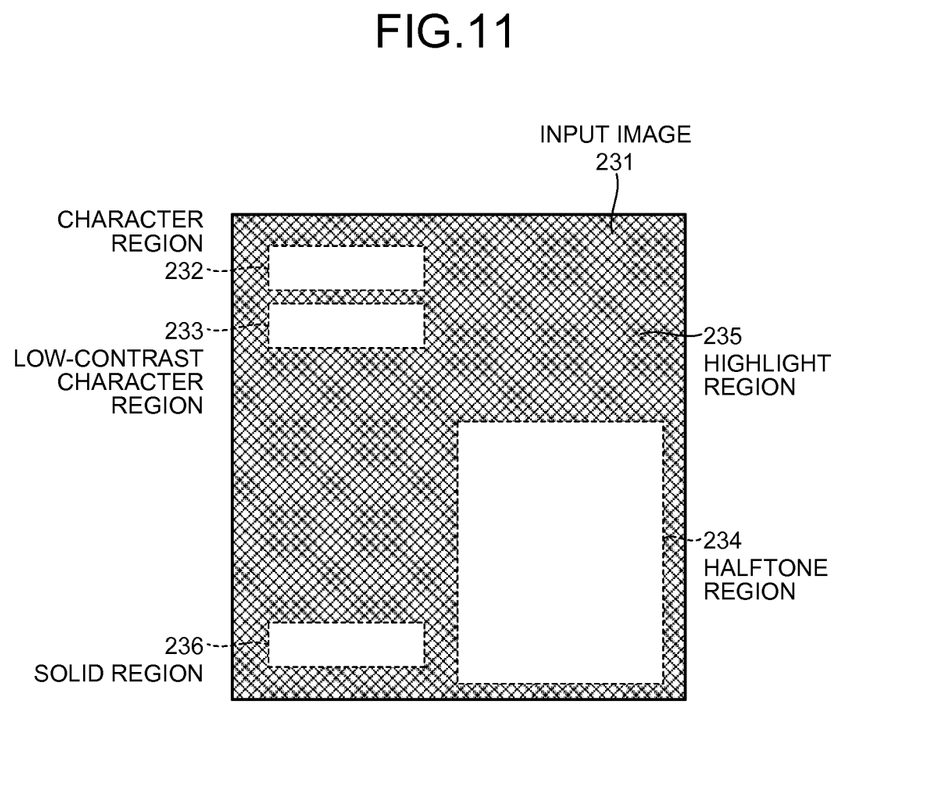
FIG. 11 is a schematic view illustrating a case when low screen ruling binary dither processing is applied to the highlight region.

On the other hand, when the luminance indicated by the S luminance information is lower than the reference value (in the case of being "dark"), the luminance of the image projection screen 108 is dark. This indicates that a distance between the projector 100 and the image projection screen 108 is large. In this case, the image is influenced by environmental light therearound easily. Therefore, the projector 100 is difficult to reproduce the bright portion of the image. In this case, when the dots of the dither processing are small, the visibility of the dots becomes bad and the highlight cannot be reproduced sufficiently. Accordingly, while giving priority to reproduction of the highlight, the halftone processing unit 206 in the embodiment applies dither processing (low screen ruling binary dither processing) with which the low screen ruling is set is applied to the highlight region 235 when the luminance indicated by the S luminance information is lower than the reference value. FIG. 11 is a schematic view illustrating a case when the low screen ruling binary dither processing is applied to the highlight region 235.

In the embodiment, the halftone processing unit 206 applies the high screen ruling binary dither processing to the highlight region 235 when the luminance indicated by the S luminance information is equal to or higher than the reference value. On the other hand, the halftone processing unit 206 applies the low screen ruling binary dither processing to the highlight region 235 when the luminance indicated by the S luminance information is lower than the reference value. However, the processing is not limited thereto. The number of gradations and the screen ruling to be converted by the dither processing can be set arbitrarily. In summary, it is sufficient that the halftone processing unit 206 executes first dither processing on the highlight region 235 when the luminance is equal to or higher than the reference value while the halftone processing unit 206 executes second dither processing, with which lower screen ruling than that with the first dither processing is set, on the highlight region 235 when the luminance is lower than the reference value.

As described above, in the embodiment, the halftone processing that varies depending on the luminance indicated by the S luminance information is executed on the first target region, so that the reproducibility of colors of an image to be projected onto the image projection screen 108 can be enhanced, thereby obtaining advantageous effects.

B: Second Embodiment

The embodiment is different from the above-mentioned first embodiment in a point that the correction unit 208 executes γ correction that varies depending on the luminance indicated by the S luminance information on the low-contrast character region 233. Descriptions of parts that are common to those in the first embodiment are omitted appropriately.

Figure 12:
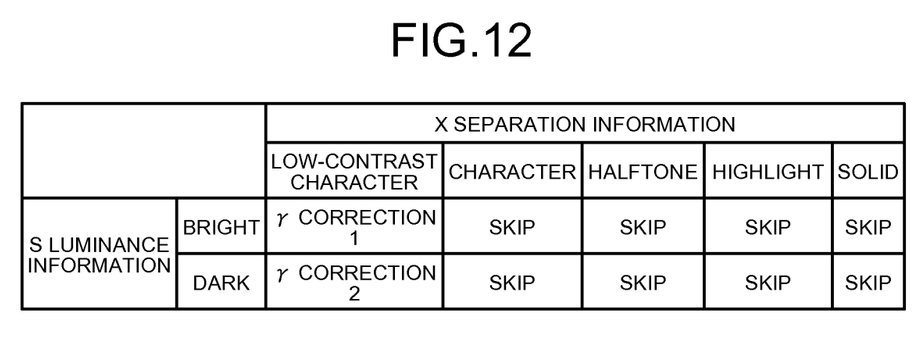
FIG. 12 is a table for explaining a method of switching γ correction in accordance with the X separation information and the S luminance information.
Figure 13:
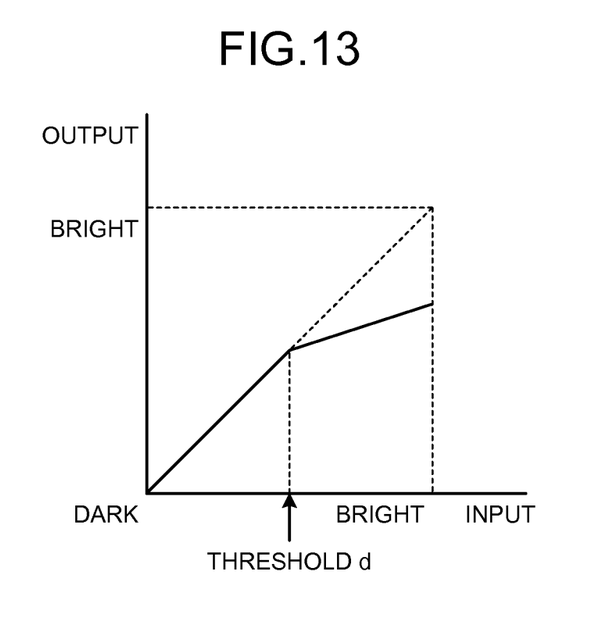
FIG. 13 is a graph illustrating an example of a γ correction curve to be used for second γ correction.

As illustrated in FIG. 12, the correction unit 208 executes first γ correction on the low-contrast character region 233 when the luminance indicated by the S luminance information is equal to or higher than the reference value (in the case of being "bright"). On the other hand, the correction unit 208 executes second γ correction on the low-contrast character region 233 when the luminance indicated by the S luminance information is lower than the reference value (in the case of being "dark"). In the first γ correction, the γ correction curve as illustrated in FIG. 6 is used. On the other hand, in the second γ correction, a γ correction curve as illustrated in FIG. 13 is used. As described above, when the luminance indicated by the S luminance information is lower than the reference value (in the case of being "dark"), an image is influenced by environmental light therearound easily and the projector 100 is difficult to reproduce a bright portion of the image further. Therefore, the second γ correction, with which the bright portion of the input image data is darker than with the first γ correction, is applied to the low-contrast character region 233. To be more specific, as illustrated in FIG. 13, the γ correction curve to be used for the second γ correction is set such that a change ratio of a gradation value of output when a gradation value of input is equal to or higher than a threshold d is lower than a change ratio of a gradation value of output when the gradation value of input is lower than the threshold d. Furthermore, the change ratio of the gradation value of output when the gradation value of input is equal to or higher than the threshold d is set to be lower than that of the γ correction curve (see, FIG. 6) to be used for the first γ correction.

In the above-mentioned embodiments, the control unit 106 causes the gradation correction unit 202 and the gradation processing unit 204 to operate in accordance with the above-mentioned bibliographic information. To be more specific, the control unit 106 does not cause the gradation correction unit 202 and the gradation processing unit 204 to operate when the bibliographic information indicates a photograph mode in which an image as an output target is handled as a photographic image. That is to say, the projector 100 does not perform any operation. On the other hand, the control unit 106 controls each of the gradation correction unit 202 and the gradation processing unit 204 so as to perform operations as described in the above-mentioned first embodiment or second embodiment when the bibliographic information indicates a character mode in which the image as the output target is handled as a character image. The MFP 101 and the projector 100 cooperate with each other such that processing on the projector 100 is made different depending on an image quality mode of the MFP 101. Therefore, a scan image can be reflected as it is and settings of the projector 100 can be omitted.

Hereinbefore, embodiments of the present invention have been described. However, the present invention is not limited to the above-mentioned embodiments and various modifications can be made in a range without departing from the scope of the present invention.

Control programs to be executed in the control unit 106 according to the above-mentioned embodiments may be configured to be provided by being recorded in a recording medium that can be read by a computer, such as a compact disc read only memory (CD-ROM), a flexible disk (FD), a CD recordable (CD-R), or a digital versatile disk (DVD), in a format that can be installed or a file that can be executed.

Furthermore, the control programs to be executed in the control unit 106 according to the above-mentioned embodiments may be configured to be provided by being stored on a computer connected to network such as the Internet and being downloaded through the network. Alternatively, the control programs to be executed in the control unit 106 according to the above-mentioned embodiments may be provided or distributed through network such as the Internet.

The present invention can provide an advantageous effect of providing a projection display device, a projection display method, and a computer program that can sufficiently enhance the reproducibility of colors.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A projection display device configured to project and display an input image input from an external device onto a screen, the projection display device comprising:
   a processor including
      an assigning unit configured to assign identification information to each pixel of the input image, the identification information indicating a gradation value for each pixel to identify a type of image for each pixel;
      a luminance detecting unit configured to detect a luminance of the screen;
      a first determining unit configured to determine a first target region of the input image using the identification information; and
      a halftone processing unit configured to execute halftone processing on the first target region to convert a number of gradations of the input image based on the luminance.

2. The projection display device according to claim 1, wherein
   the first determining unit determines a region constituted by pixels whose gradation values are equal to or higher than a threshold as the first target region and to identify the type of image of the first target region as a highlighted region of the input image, and
   the halftone processing unit is configured to execute first dither processing on the first target region if the luminance is equal to or higher than a reference value and execute second dither processing, with which lower screen ruling than the screen ruling with the first dither processing is set, on the first target region if the luminance is lower than the reference value.

3. The projection display device according to claim 1, wherein
   the first determining unit determines a region constituted by pixels whose gradation values are equal to or higher than a threshold as the first target region and to identify the type of image of the first target region as a low contrast character region of the input image,
   the halftone processing unit is configured to execute first halftone processing on the first target region if the luminance is equal to or higher than a reference value and execute second halftone processing on the first target region if the luminance is lower than the reference value, and
   the number of gradations after being converted through the first halftone processing is smaller than the number of gradations after being converted through the second halftone processing.

4. The projection display device according to claim 1, wherein the processor includes:
   a correction unit configured to perform gradation correction to correct input/output characteristics of an image; and
   a second determining unit configured to determine a second target region of the input image on which the gradation correction is performed using the identification information, wherein
   the correction unit is configured to execute the gradation correction on the second target region based on the luminance.

5. The projection display device according to claim 4, wherein
   the second determining unit is configured to determine a region constituted by pixels whose gradation values are equal to or higher than a threshold as the second target region and to identify the type of image of the second target region as a low contrast character region of the input image, and
   the correction unit is configured to execute first gradation correction on the second target region if the luminance is equal to or higher than a reference value and execute second gradation correction, with which a bright portion of the input image becomes darker than with the first gradation correction, on the second target region if the luminance is lower than the reference value.

6. The projection display device according to claim 4, wherein the processor includes a control unit configured to control operations of the halftone processing unit and the correction unit in accordance with bibliographic information indicating operation conditions of the external device that outputs image data of a scanned document as the input image.

7. The projection display device according to claim 6, wherein the control unit is configured to not operate the halftone processing unit and the correction unit if the bibliographic information indicates a photograph mode in which an image as an output target is handled as a photographic image, and the control unit is configured to operate the halftone processing unit and the correction unit if the bibliographic information indicates a character mode in which the image as the output target is handled as a character image.

8. The projection display device according to claim 1, wherein an area of the first target region on the display is less than an area of the input image on the display.

9. A projection display method of projecting and displaying an input image input from an external device onto a screen, the projection display method comprising:
   assigning, by a processor, identification information to each pixel of the input image, the identification information indicating a gradation value for each pixel to identify a type of image for each pixel;
   detecting a luminance of the screen;
   determining, by the processor, a target region of the input image using the identification information; and
   executing, by the processor, the halftone processing on the target region to convert a number of gradations of the input image based on the luminance.

10. A computer program product comprising a non-transitory computer-usable medium having a computer program that causes a computer to execute:
   assigning identification information to each pixel of the input image, the identification information indicating a gradation value for each pixel to identify a type of image for each pixel;
   detecting a luminance of a screen onto which the input image is projected and displayed;

determining a target region of the input image using the identification information; and executing the halftone processing on the target region to convert a number of gradations of the input image based on the luminance.

* * * * *